March 7, 1950 E. K. CLARK 2,500,061
TEMPERATURE RESPONSIVE CONTROL
Filed Sept. 6, 1944 4 Sheets-Sheet 1

INVENTOR
EARL K. CLARK.
BY P. J. Eisinger
ATTORNEY

FIG. 3.

March 7, 1950   E. K. CLARK   2,500,061
TEMPERATURE RESPONSIVE CONTROL
Filed Sept. 6, 1944   4 Sheets-Sheet 3

WITNESSES:
J. X. Mosser
E. H. Lutz

INVENTOR
EARL K. CLARK.
BY R. J. Eisinger
ATTORNEY

March 7, 1950  E. K. CLARK  2,500,061
TEMPERATURE RESPONSIVE CONTROL
Filed Sept. 6, 1944  4 Sheets-Sheet 4

INVENTOR
EARL K. CLARK.
BY R. J. Eisinger
ATTORNEY

Patented Mar. 7, 1950

2,500,061

UNITED STATES PATENT OFFICE 2,500,061

TEMPERATURE RESPONSIVE CONTROL

Earl K. Clark, Mansfield, Ohio, assignor to Westinghouse Electric Corporation, East Pittsburgh, Pa., a corporation of Pennsylvania Application September 6, 1944, Serial No. 552,872

12 Claims. (Cl. 200—136.3)

This invention relates to an improved control mechanism for regulating the heat output of a heating element, more particularly a surface unit, or a deep well cooker, of an electric range, and it has for an object to provide an improved device of the character set forth.

A further object is to provide a control mechanism that automatically regulates the heat output of the heating element or surface unit to maintain a cooking vessel placed thereon at the desired temperature.

It has been the practice generally to regulate the heat output of a range surface unit by manual manipulation of a knob or the like which requires adjustment by the operator during a cooking operation to maintain the food being cooked at the proper temperature. For example, it is customary to turn the knob to the position of maximum heat output to bring the cooking vessel as rapidly as possible to the cooking temperature, and then to turn the knob to a position of lower heat to maintain the cooking operation. In some cooking operations, such as frying or grilling, constant attention on the part of the operator and manipulation of the knob may be necessary to be sure that the pan or griddle does not become too hot or too cold. In rewarming foods and in preparing foods that do not require boiling temperature, the attention of the operator is required to insure that the foods are not overheated, with the result that the food may be heated at a slow rate to prevent scorching; thus, a good deal of time may be wasted in warming such foods.

In accordance with the present invention, a control mechanism is provided which automatically regulates the average wattage input to the heating element, and which thereby regulates its heat output, by periodically making and breaking the circuit to the heating element. It includes switch mechanism which is automatically positioned in response to the temperature of the cooking vessel to vary the length of the "on" period in each cycle, and it operates to gradually reduce the average wattage input upon increase in temperature of the vessel through a limited range of temperature, which range may be manually adjusted or varied. When the temperature of the cooking vessel is below the regulating range, the heating element is continuously energized to effect maximum wattage input, thereby raising the temperature of the vessel as rapidly as possible.

Thus, for example, if it is desired to grill pork chops on a pan at a temperature of 400° (all temperatures in this specification are in degrees Fahrenheit), it is merely necessary to set the present control by means of a knob which may be graduated in degrees of temperature. This setting provides a regulating range of, for example, 375° to 415°. Initially, the control effects maximum wattage input to the heater to rapidly raise the temperature of the pan. As the temperature exceeds 375° and enters the regulating range, the wattage input is gradually reduced until an equilibrium is reached at the desired temperature of 400°, after which the control provides the proper wattage input to maintain this temperature.

Should the operator then desire to cook at a lower temperature, it is only necessary to adjust the knob to a lower temperature setting, and when the pan has cooled to the new temperature, it is maintained at this temperature by the present control.

The temperature control mentioned above is also obtainable for temperatures below the boiling point and provides accurate temperature regulation in the so-called "warming" range.

The majority of foods prepared on the surface units of an electric range are cooked in boiling water and it is desirable to obtain different rates or degrees of boiling from a slow simmer to a fast or hard boil. In cooking foods in boiling liquid with the present control, the degree of boiling is easily controlled by adjustment of the same knob used for temperature control of the heating element, even though the temperature of the vessel remains substantially constant. In this instance, the control functions to adjust the average wattage input to the heating element when the boiling temperature has been reached. In addition, it functions as described above to provide maximum wattage input to effect rapid raising of the temperature until the boiling temperature is approached.

These and other objects are effected by the invention as will be apparent from the following description and claims taken in connection with the accompanying drawings, forming a part of this application, in which:

Figure 1:
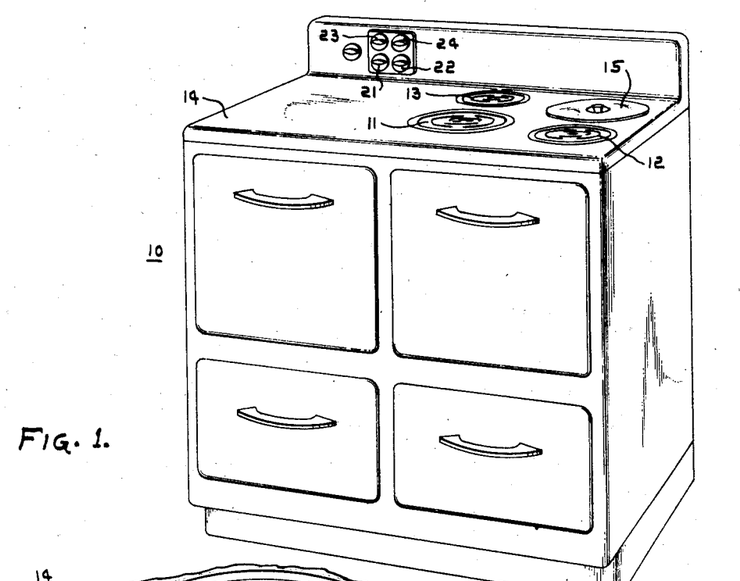
Fig. 1 is a perspective view of an electric range embodying a control in accordance with my invention.
Figure 2:
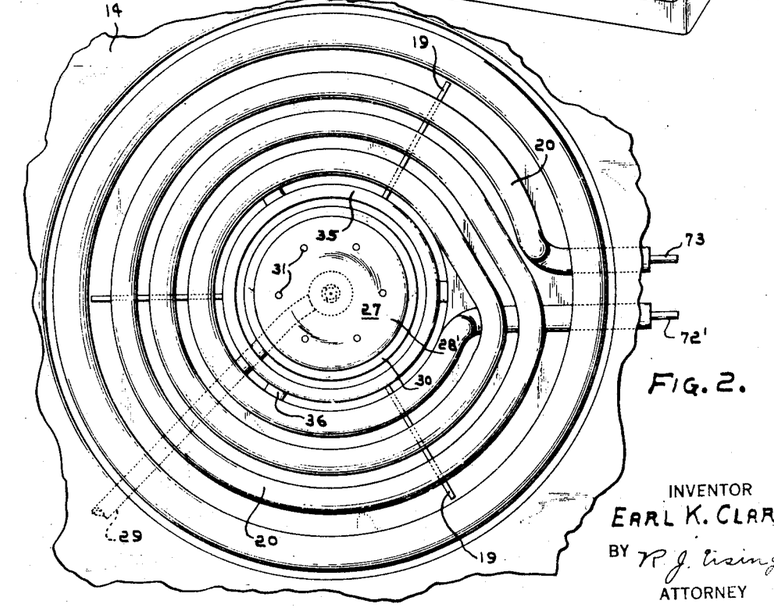
Fig. 2 is a top plan view of one of the surface units.
Figure 3:
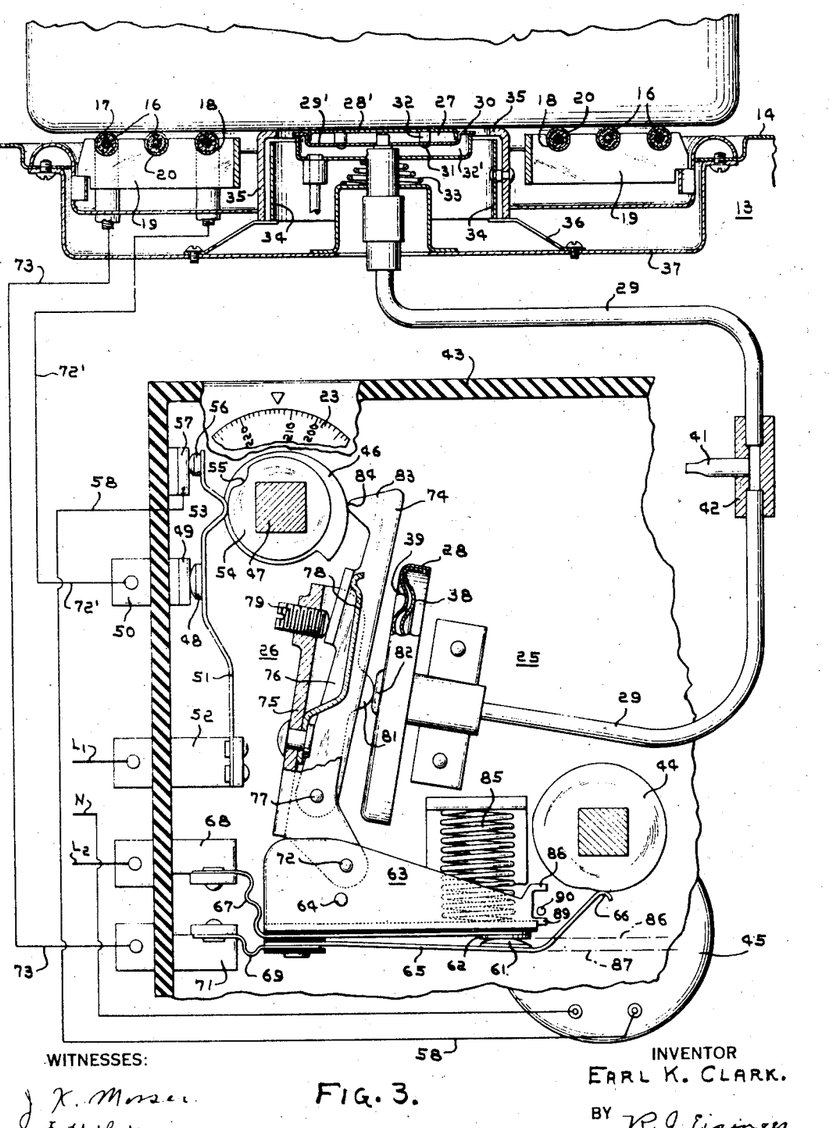
Fig. 3 is a diagrammatic view showing the control for one of the surface units.

Referring to the drawings in detail, I show an electric range 10 which may be generally of conventional construction. It includes three surface heating units 11, 12 and 13 disposed in the platform 14, and a deep well cooker 15 which is provided with a heating unit disposed at the bottom of the well, as is well understood in the art. The heating units may be of any suitable electrically-energized type, although I prefer a unit having a tubular or sheathed type of heater 20 as shown in Fig. 3, in which a resistance element 16 is enclosed in a tube or sheath 17 and held therein by insulating material 18. The tubular heater 20 is arranged in a flat spiral, as shown in Fig. 2, and mounted in a spider 19. The heating unit is mounted in the platform in any suitable manner, the details of which form no part of the present invention. The controls for the heating units 11, 12, 13, and the deep well cooker 15 include manually-adjusted knobs 21, 22, 23 and 24, respectively. These knobs may be located on the front of the backsplasher, as shown in Fig. 1.

Referring now to Fig. 3, there is shown the control for the surface unit 13. This control includes a thermal or hydraulic system 25 and a switch mechanism 26. The hydraulic system includes a thermostatic bulb or chamber 27, an expansible chamber or hydraulic switch-actuating member 28, and capillary tubing 29 connecting the bulb 27 and the expansible chamber 28. The bulb 27 comprises two flanged discs 28' and 29', which are preferably connected in fluid-tight relation in any suitable manner, as by brazing. Rivets 31 and bushings 32 may be provided to hold the central portions of the discs 28' and 29' in fixed spaced relation. Disposed below and circumferentially around the bulb 27 is an insulating chamber 32', in which a vacuum may be provided. However, I have found that air provides satisfactory heat insulation. It will be noted that the top of the peripheral portion of the chamber 32', formed by a flange 30 of the disc 29', is spaced slightly below the upper surface of the disc 28' to avoid contact with the bottom of a vessel placed on the heating unit. The bulb 27 is preferably biased upwardly by a spring 33 against the lower surface of a cooking vessel placed on the heating unit, in order to provide good heat conduction therebetween.

An annular heat baffle comprising rings 34 and 35 may also be provided. This baffle encompasses the hub 27 and provides an obstruction to flow of heat from the tubular heater to the bulb. The rings 34 and 35 may be made of a metal or other material of relatively poor heat conductivity, such as stainless steel, and are held in fixed spaced relation by suitable rivets and bushings. This heat baffle may rest on springs 36, fastened to a pan 37, which is in turn fastened to the platform 14, the springs also biasing the heat baffle upwardly against the cooking vessel. The heat baffle is not attached and may be readily removed. The surface unit 13 is constructed so that it may be readily removed without disturbing the bulb 27. It is to be understood that, so far as the present invention is concerned, any suitable construction of heating unit and mounting therefor may be employed.

The expansible chamber 28 comprises two flexible discs or diaphragm members 38 and 39, providing the expansible chamber therebetween. A device such as the expansible chamber 28 is also referred to as a diaphragm, and as a wafer. The enclosed space comprising the bulb 27, the expansible chamber 28, and the interior of the connecting tube 29 is completely filled with a suitable liquid that is non-vaporizable at cooking temperature, that is, a liquid which remains in the liquid state throughout the entire range from the lowest normal ambient room temperature to the highest cooking temperature, which may, for example, be assumed to be 625°. One known fluid which is satisfactory for this purpose is chlorinated diphenyl. However, it is to be understood that any other liquid, now or hereafter known, that remains in liquid form throughout the desired temperature range may be used. This space is filled with the liquid in any suitable manner; for example, through a tube 41 and a coupling 42, after which the tube 41 is pinched off and sealed.

The switch mechanism 26 is disposed in the upper left-hand portion of a rectangular or square casing 43, in which the switch mechanisms of the other controls may also be housed. A cam 44, driven through suitable reduction gearing (not shown) by a motor 45 mounted on the back of the casing 43, may be common to and serve the several controls.

Figures 8, 9:
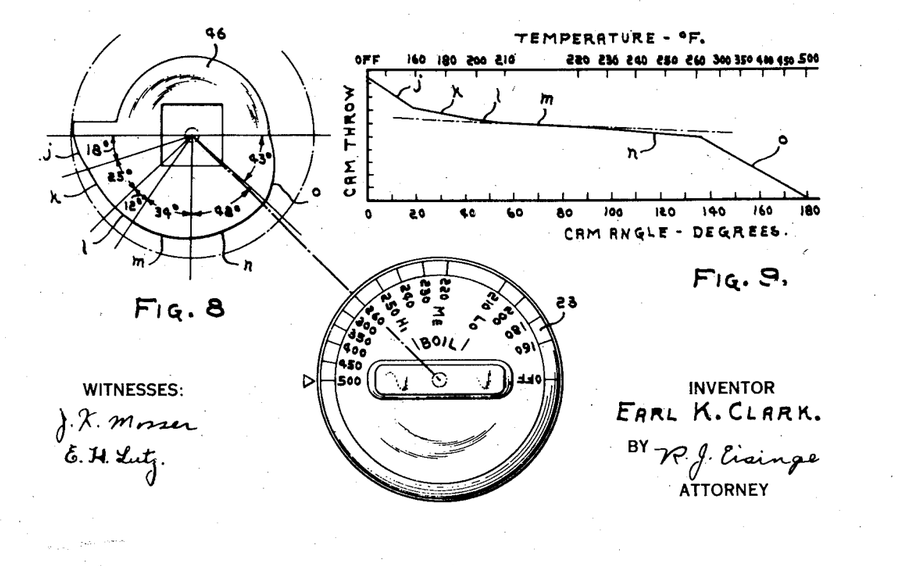
Fig. 8 shows the manually-adjustable cam and the knob which positions such cam.
Fig. 9 is a graphic illustration of the contour of the manually-adjustable cam of Fig. 8.

The switch mechanism 26 includes a manually-adjustable cam 46 mounted on the shaft 47 that projects forwardly through the backsplasher to the front thereof. The knob 23 is mounted on the forward end of the shaft 47 in front of the backsplasher. The knob 23 may be graduated in degrees of temperature, as shown in Fig. 8, each indicia indicating the temperature maintained in an average vessel containing food when the knob is turned to the position bearing such indicia. Alternatively, the various temperature settings may be designated by letters, arbitrary numbers, or other indicia. The names of various foods might be applied to designate the temperatures at which they are to be cooked. The knob preferably also bears indicia showing the positions to which the knob is adjusted to provide different rates of boil, such as the indicia "Lo," "Me" and "Hi," representing low, medium and high rates of boiling. The knob may further be provided with indicia to indicate the positions providing predetermined pressures, such as 15 and 20 pounds per square inch, for pressure cooking. In addition, the knob has an "off" position, in which the contacts are in open position.

The switch mechanism 26 is a two-pole switch. One pole comprises contacts 48 and 49 for opening one side of the line in the "off" position of the knob. The contact 48 is carried on a switch arm 51 fixed at one end to a terminal 52, while the stationary contact 49 is carried by a terminal 50. The spring arm is bent to form a cam follower 53 engaging the peripheral cam surface of a cam 54 mounted on the shaft 47 in front of the cam 46. The cam 54 is formed with a recess 55 to permit the spring arm 51 to move the contact 48 to open position when the knob 23 is turned to its "off" position. In all other positions, the cam 54 holds the spring arm 51 in closed circuit position. The spring arm 51 also carries a contact 56 engageable with the stationary contact 57 of a circuit 58 for the motor 45. As will be apparent, the circuit 58 is closed simultaneously with engagement of the contacts 48 and 49 at all times that the knob is moved away from its "off" position.

The other pole of the switch 26 comprises a pair of abutting contacts 61 and 62 which control the other side of the line. These contacts constitute a line switch to open the other side of the line in the "off" position, and also serve as the regulating contacts to regulate the average wattage input to the heating element. The contact 62 is mounted on but electrically insulated from a bracket or lever 63 pivoted or fulcrumed on a pivot pin 64 carried by the casing 43. The contact 61 is mounted on a spring arm 65, one end of which is fastened to but insulated from the lever 63, as shown on the drawings. The other end of the spring arm 65 is extended and formed to provide a cam follower 66 adapted to engage the peripheral cam surface of the cam 44, thereby to move the contact 61 up and down periodically, as will be further described. Thus, the contacts 61 and 62 are both carried by the lever 63. The cam 44 is preferably made of a plastic material such as "Micarta," in which case it provides insulation between the contact 61 and the shaft on which the cam is carried.

The contact 62 is connected through a flexible conductor 67 to a terminal 68, while the contact 61 is connected through a flexible conductor 69 to a terminal 71. The terminals 52 and 68 are connected to a suitable source of electric current, such as the line conductors L1 and L2, which provide a substantially constant voltage, such as 220 volts. The terminals 50 and 71 are connected through conductors 72' and 73 to the opposite terminals of the heating element 16. There is thus provided a complete circuit through the heating element 16 which is traced as follows: Conductor L1, terminal 52, arm 51, contacts 48 and 49, terminal 50, conductor 72', heating element 16, conductor 73, terminal 71, conductor 69, arm 65, contacts 61 and 62, conductor 67, terminal 68 and conductor L2. The circuit 58 for the motor is connected to the conductor L1, through the spring arm 51, and the contacts 56 and 57, and to the neutral conductor N, which conductors provide 110 volts.

The lever 63 is positioned by the lower end of a lever 74, being connected thereto by a pivot pin 72. The lever 74 comprises two parts 75 and 76, which are normally in fixed relation and, therefore, act as a single lever in normal operation. They are pivotally connected by a pivot pin 77, and a spring 78 biases the part 76 against a set screw 79 carried by the part 75. The set screw provides for calibration, and the flexibility provided by the spring provides relief under a condition which will be explained later.

The lever 74 is provided with an abutment 81, formed on the part 75, which is adapted to abut and to be actuated by the expansible chamber 28, the point of contact being referred to as the point 82. The lever 74 is also provided with an abutment 83, formed at the upper end of the part 76, adapted to engage the peripheral cam surface of the manually-adjustable cam 46, the point of contact being designated as point 84. A compression spring 85 biases the lever 63 downwardly, and through the pivot pin 72 biases the lever 74 in counterclockwise direction to cause the same to bear against the cam 46 and the expansible chamber 28. The spring 85 may be omitted, however, especially if the spring arm 65 is of sufficient strength. The lever 63 is preferably provided with abutments 88 and 89 adapted to engage a stop pin 90 upon movement of the lever 63 slightly beyond its regulating range or travel at each end.

Figure 4:
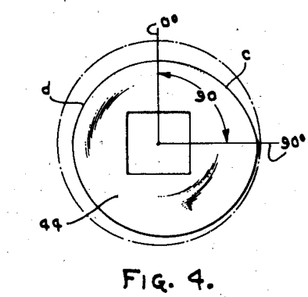
Fig. 4 is an elevational view of one form of motor-driven cam that may be employed.
Figure 5:
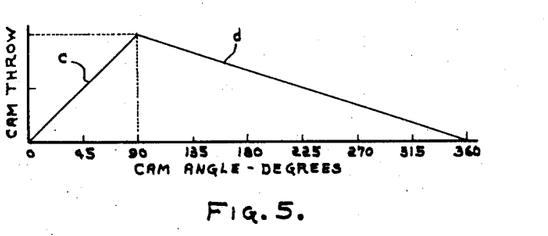
Fig. 5 is a graphic illustration of the cam contour of Fig. 4.

In Figs. 4 and 5, there is shown a simple form of motor-driven cam 44. From the lowest point marked "0°," the cam surface $c$ rises at a constant rate to the point marked "90°." For the remainder of the circumference, designated $d$, the surface falls at a constant rate, that is, the drop is the same for each degree of revolution of the cam. The reason for providing a steeper rise than fall is to provide a more rapid separation of the contacts 61 and 62.

Figure 6:
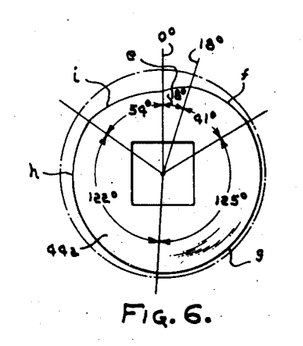
Fig. 6 is an elevational view of a modified form of cam.
Figure 7:
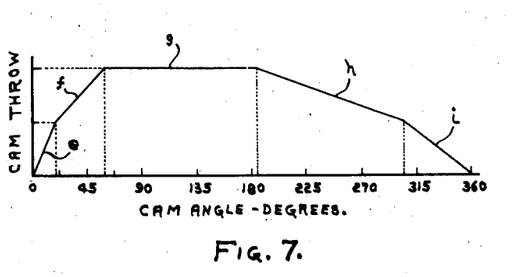
Fig. 7 is a graphic illustration of the cam contour of Fig. 6.

In Figs. 6 and 7, I show a modified and preferred form of motor-driven cam 44a. The purpose of modifying the cam surface is to provide a steeper rise, and therefore, a more rapid separation of the contacts 61 and 62. Also, the slope is greatest in that portion of the cam surface which most frequently effects the contact separation. In this form, the cam surface $e$ rises from a point marked "0°" to that marked "18°." The rise may be, for example, .025 inch or half of the total cam throw or rise. For the next 41°, the cam surface $f$ rises .025 inch, the rate of rise being considerably less. For the next 125°, the surface $g$ is circular, that is, of constant height. In the next 122°, the surface $h$ falls .025 inch, and in the next part $i$ of 41° there is another fall of .025 inch. The rate of rise or fall within each of the zones may be constant, as illustrated in Figs. 6 and 7, but it is not necessarily so. This form of cam provides a regulating range having somewhat different characteristics, as will be explained later.

Figure 12:
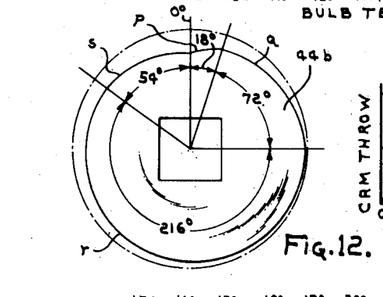
Fig. 12 is an elevational view of a third form of motor-driven cam.
Figure 13:
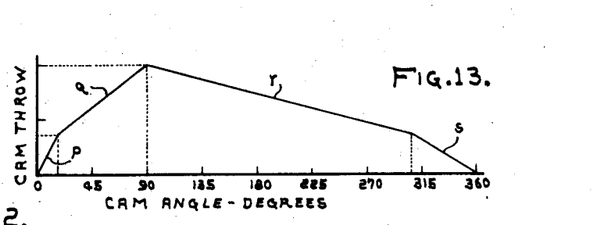
Fig. 13 is a graphic illustration of the cam contour of Fig. 12.

The motor-driven cam 44b shown in Figs. 12 and 13 is generally similar to the cam 44a of Figs. 6 and 7, except that it omits the portion $g$ of uniform height. From the point marked 0°, the surface $p$ rises .025 inch through an angle of 18°, and then rises another .045 inch through the next part $q$ of 72°. It then drops .045 inch through the next 216° surface $r$ and .025 inch during the remaining 54° surface $s$. The rate of rise or fall within each of these zones may be constant as assumed in this case, but it is not necessarily so.

In Figs. 8 and 9, I show one form of manually-adjustable cam 46. The highest part or beginning point of the cam, at the beginning of the steep surface *j*, provides the "off" position in which all contacts are open. The first or warming zone *k* of the temperature controlling cam surface provides variation in temperature from just under 160° to just under 200°. The second zone *l* provides temperature settings from just under 200° to just under 210°. The third zone *m* provides variation from just under 210° to just above 220°. This is also referred to as the boiling zone, since it provides variation from a light boil to a medium boil when a vessel containing a body of water is placed on the heating unit. This zone may be extended to a higher temperature, such as 230°, to extend the closely controlled boiling zone that it provides. The fourth zone *n* provides variation from just above 220° to just above 260°. The fifth zone *o* provides variation from just above 260° to 500°.

It will be noted from Figs. 8 and 9 that the slope or incline of the third or boiling zone *m* is substantially less than that of the second zone *l* and the fourth zone *n*, disposed on opposite sides of the boiling zone. In Fig. 9, the line *m* is extended by the dot-and-dash line to show the difference in slope or incline. The purpose of this is to enable the operator to provide a closer or vernier adjustment of the rate or degree of boiling that is desired.

The manually adjustable cam used with the various forms of motor-driven cam is substantially the same. It may comprise exactly the same zones, although the exact values of cam height may vary slightly depending upon the characteristics of the particular motor-driven cam that is employed.

*Operation*

The cam 44 is continuously rotated during the entire time that the control is in operation. The speed of rotation may be, for example, one revolution per minute. Assuming the contact 62 to be sufficiently raised, the cam follower 66 engages the cam 44, so that the spring arm 65 and the contact 61 are periodically moved up and down. The lines 86 and 87 indicate the upper and lower limits of the travel of the upper or contact face of the contact 61, and this range of movement will be referred to as the regulating range or travel of the contact 61.

The contact 62 is moved toward and away from the contact 61 to vary the wattage input. When the contact 62 is moved below the line 87, the contacts are in continuous engagement to effect maximum wattage input. The follower 66 is held by the spring 85 out of contact with the cam 44 during the entire rotation of the cam. If the spring 85 were omitted, the follower 66 might ride the cam but the contacts 61 and 62 would remain in engagement under force of the spring arm 65. When the contact 62 is moved above the line 86, the contacts are continuously out of engagement to provide zero wattage input. In this case, the follower 66 is in continuous engagement with the cam 44 to move the contact 61 the full travel between the lines 86 and 87.

When the lower or contact face of the contact 62 is positioned within the travel of the contact 61, between the lines 86 and 87, the contacts are in engagement during a portion of each cycle or revolution of the cam 44. As the contact 61 moves upwardly, it engages the contact 62 at an intermediate point in its travel, thereby completing the circuit. The follower 66 is then held against further movement and out of engagement with the cam 44, until a rising portion thereof again engages the follower 66 to move the contact 61 downwardly. Thus, the circuit to the heating element is completed during a portion only of each cycle.

The average wattage input to the heating element is thus reduced, and, due to the heat inertia of the heating element, the effect is substantially the same as if a steady current had been reduced in some other manner. The portion of each cycle that the contacts are in engagement varies with the position of the contact 62. Using a rotating cam 44 of the form shown in Figs. 4 and 5, the percentage of each cycle that the contacts are in engagement and the percentage of full wattage that is produced is directly proportional to the amount that the contact 62 is moved downwardly below the line 86, as illustrated by the straight lines in Fig. 10, to which further reference will be made.

Figure 11:
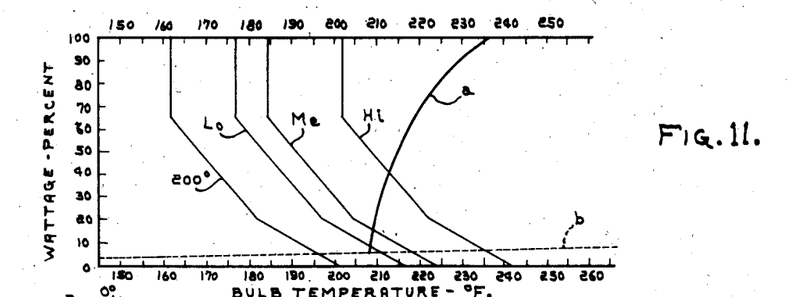
Fig. 11 is a similar graph, using the motor-driven cam of Fig. 6.

When using a rotating cam of the form shown in Figs. 6 and 7, a different characteristic is obtained, as illustrated in Fig. 11. Assuming the contact 62 first to have been positioned below the line 87, which effects continuous energization, then, upon upward movement above the line 87, the wattage is immediately reduced to 65 per cent, due to the fact that the highest surface of the cam is a circular surface extending for 125 degrees. In other words, as soon as the contact 62 has moved upwardly above the line 87 to permit the cam to separate the contacts, they are separated for at least 125 degrees of each revolution. As the contact 62 moves upwardly through one-half of the regulating range, the wattage is reduced from 65 per cent to 20 per cent, this variation being effected by the sections *f* and *h* of the cam surface. As the contact 62 is moved upwardly through the upper half of the regulating range, the wattage is reduced from 20 per cent to zero by the sections *e* and *i* of the cam surface.

Using a cam of the form shown in Figs. 12 and 13, the wattage is decreased from 100 per cent to 20 per cent by the sections *q* and *r* of the cam surface as the contact 62 moves upwardly through approximately one-half of the regulating range or travel. The wattage is decreased from 20 per cent to zero as it moves upwardly through the remainder of the regulating range.

The hydraulic or thermal system 25 operates to position the contact 62 in response to the temperature of the vessel placed on the surface unit 13. Upon increase in temperature of the vessel, the liquid within the thermostatic bulb 27 expands, causing liquid to flow through the tube 29 into the expansible chamber 28, thereby moving the lever 74 in clockwise direction about the point 84. Through the pivot 72, the lever 63 and the contact 62 are moved upwardly away from the contact 61. Conversely, upon decrease in temperature of the vessel, the liquid in the bulb 27 contracts, so that the chamber 28 collapses or contracts and the lever 74 moves in counterclockwise direction about the point 84 under force of the spring 85, which lowers the lever 63 and moves the contact 62 downwardly toward the contact 61. The position of the point 82 varies with the temperature of the vessel, said point being moved to the left upon increase and to the right upon decrease in temperature.

The position of the contact 62 is also varied by the manually adjustable cam 46. The effect of turning the cam 46 is to vary the temperature setting of the control. When the cam is turned in clockwise direction to bring a lower portion of the cam surface in contact with the lever 74, the latter is first tilted in counterclockwise direction about the point 82 to move the contact 62 downwardly in the direction of increased heat. Accordingly, a higher temperature is required to restore the contact 62 to a given position. In other words, the temperature limits between which the control regulates are raised, thereby providing a higher temperature setting. Conversely, if the cam 46 is turned in counterclockwise direction to bring a higher point of the cam in contact with the lever 74, the latter is tilted in clockwise direction to move the contact 62 in the direction of decreased heat. The control is now adjusted to operate between lower temperature limits, thereby providing a lower temperature setting. It will be noted, therefore, that the contact 62 is positioned in accordance with the resultant of the action of the thermal or hydraulic system 25 and the position of the manually adjustable cam 46.

The operation of the control will now be considered in connection with typical cooking operations.

Figure 10:
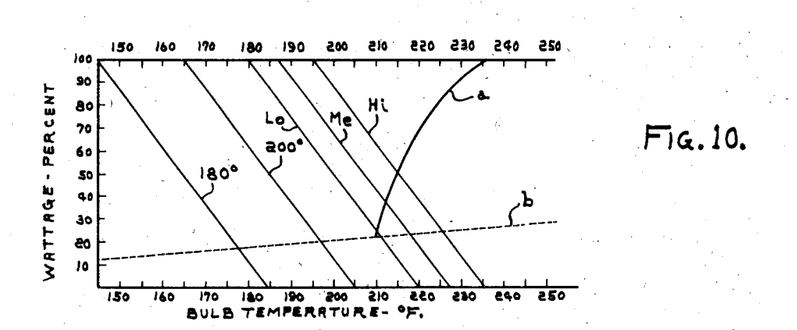
Fig. 10 is a graph illustrating the relation of wattage to bulb temperature for several temperature adjustments, using the motor-driven cam of Fig. 4.

An embodiment using the cam of Figs. 4 and 5 will first be considered. The relation of temperature to wattage of such an embodiment, for several temperature settings, is graphically illustrated in Fig. 10. The temperatures represented by the ordinates are temperatures of the bulb 27. The bulb responds to the temperature of the vessel and under ideal conditions its temperature would be equal to the temperature of the vessel. However, in practice, some variation has been found to occur. At the higher wattages, the bulb is affected by the heat from the heater 20 and its temperature is higher than that of the vessel. At the lower wattages, the bulb temperature is somewhat lower than the vessel temperature. However, the bulb temperature is responsive to vessel temperature and assumes a definite value dependent upon the temperature of the vessel and the temperature or wattage of the heater. As an example, the variation in bulb temperature with various wattages, while the contents of the vessel remain at the boiling point, is represented by the line a in Fig. 10. The line b represents, for each temperature of the bulb, an assumed value of the percentage of full wattage required to maintain an average vessel, or one chosen as a standard, at the temperature corresponding to such bulb temperature. In Fig. 10, relatively high percentage values have been assumed for clarity of illustration. For some of the more modern high capacity heating units, the values are lower.

Assume now that a vessel is placed on the surface unit and that it is desired to effect a warming operation, for example, to heat the contents to 200° but not to boil the same. The knob 23 is adjusted to the position marked "200°," which provides the range of 165° to 205° bulb temperature, as represented by the line designated "200°" in Fig. 10. The turning of the knob from the "off" position moves the contact 56 to close the circuit to the motor driving the cam 44. The contact 48 is also moved into engagement with the contact 49. The clockwise movement of the cam 46 tilts the lever 74 in counterclockwise direction to lower the contact 62. As the temperature of the vessel is well below the regulating range, the contact 62 is moved well below the line 87, so as to effect continuous energization of the heating element to rapidly raise the temperature of the vessel. As the temperature of the vessel increases and the liquid in the bulb 27 expands, the lever 74 is tilted in clockwise direction to raise the contact 62. As the bulb temperature increases above 165° and enters the regulating range, the cam follower 66 moves into position to be engaged by the cam 44. Thus, the contacts 61 and 62 are opened a portion of each revolution to gradually reduce the average wattage input to the vessel. However, the heat delivered to the vessel is still greater than the heat loss from the vessel, so that the temperature continues to rise. The decrease in wattage input is proportional to the increase in temperature, as indicated by the line 200°. As the heat output of the heating unit is reduced to substantially balance the heat loss from the vessel, there is no further increase in temperature and equilibrium is reached. In the case assumed, equilibrium is reached with the bulb at about 197° C. and the vessel at 200°, at which the control provides 20 per cent of full wattage. Thus, the control automatically operates to supply that wattage input which is necessary to maintain the cooking vessel at the desired temperature.

In the case just mentioned, a cooking vessel of average size was assumed. If a larger vessel having greater heat loss had been used, a somewhat lower temperature would be attained. For example, assume that the vessel had 50° greater heat loss and required 30 per cent of full wattage to maintain its temperature. In such case, the temperature of the vessel would have reached only 196°, with a bulb temperature of about 193°, since 30 per cent wattage would be able merely to balance the heat loss from the vessel and, therefore, would not be able to raise the temperature of the vessel above 196°.

Referring back to the vessel of average size, assume that it has been heated to 200° and that it is now desired to lower the temperature to 180°. The knob is turned in counterclockwise direction to the 180° position to adjust the control for the regulating range represented by the line 180° in Fig. 8. The counterclockwise movement of the cam 46 tilts the lever 74 in clockwise direction to raise the contact 62. Since the new temperature range is below the temperature of the vessel, the contact 62 is moved above the line 85 to effect continuous deenergization of the heating element. As the vessel cools, the diaphragm 28 collapses and the lever 74 is tilted in counterclockwise direction to lower the contact 62. When the bulb temperature drops below the upper limit of the regulating range, the contact 62 moves into the regulating range or travel of the contact 61 to effect energization during a small portion of each period. The period of energization gradually increases with the drop in temperature, until, with the vessel at 180° and the bulb at 178°, the wattage input is sufficient to balance the heat loss and the vessel temperature of 180° is maintained.

When a boiling operation is effected, during which the vessel contains water at atmospheric pressure, the vessel temperature cannot increase beyond but stays at 212°. In this case, the present control operates as a wattage regulator, that is, each position of the knob within the appropriate range provides a particular wattage. A number of such positions are preferably indicated on the knob. For example, in the illustrated embodiment, the positions providing 24 per cent, 37 per cent and 50 per cent wattage and effecting low, medium and high rates of boil, are designated "Lo," "Me" and "Hi," respectively.

Assume now that it is desired to effect boiling operation of a vessel placed on the surface unit and that a low rate or degree of boiling is desired. The knob is turned to the position designated "Lo," which provides the temperature setting represented by the line "Lo" in Fig. 8. The heating element is continuously energized, as before, until the bulb temperature reaches 180°. The wattage input is then gradually reduced and the temperature continues to rise until the boiling point is reached, after which the temperature of the vessel stays at 212°. The control continues to effect about 24 per cent wattage input, which is the wattage provided by this particular adjustment in response to a bulb temperature of 210°.

If a greater degree of boiling is desired, the knob is adjusted to a higher temperature position; for example, to the position chosen and designated "Me," which provides the temperature setting indicated by the line "Me." Such adjustment of the knob lowers the contact 62 and increases the wattage. The bulb temperature increases slightly, in this case to 212°, and a wattage of about 37 per cent is provided. In the illustrated embodiment, the position marked "Hi" provides the temperature range marked "Hi" in Fig. 8. In this case, the bulb temperature rises to about 215° and about 50 per cent wattage is obtained. Still higher wattages may be obtained by adjusting the knob to still higher temperature settings, which in the illustrated embodiment are indicated only by the temperature indicia, inasmuch as such higher temperatures are not frequently used for boiling.

Thus, while the cam 46 provides different temperature settings or regulating ranges, the effect is, so far as boiling water is concerned, to provide a fixed wattage or degree or boil determined by the position of the cam.

In order that the degree of boil may be more readily and accurately controlled, I provide, in accordance with the present invention, a form of cam including a portion shown on the drawing at m in Fig. 9, which provides different rates of boil and which is of less slope or incline than the other portions of the cam providing lower and higher temperature settings. This will be readily understood from Fig. 9, which graphically indicates the shape of the cam. The portion m of the cam surface from just below 210° to just above 220° provides change in setting from very low or zero boiling to a medium degree or rate of boil. A relatively great movement of the cam is required to effect a change of a given number of degrees in temperature setting of the cam. The effect of this is to be able to choose more accurately the degree of boil desired. Greater rates of boil are provided by the zone extending from just above 220° to just above 260°, which is of greater slope and does not provide as close an adjustment of rate of boiling. However, the closer adjustment is needed more particularly for the lower rates of boiling.

If a vessel is placed on the surface unit without water or if all the water boils away, then the temperature does increase beyond 212° and the control then further reduces the wattage until the heat delivered to the vessel equals the heat loss from the vessel. For example, with the knob turned to "Lo," the vessel temperature may increase only to about 214°, when equilibrium is reached and no further increase in temperature occurs. For "Me" and "Hi" positions, the vessel temperature would be held to approximately 221° and 229°, respectively. Thus, protection is afforded against excessive temperatures, since increase in temperature is accompanied by decrease in wattage input to the element and corresponding decrease in heating output of the surface unit.

To effect a frying operation, the knob is adjusted to a temperature suitable for frying, such as 400°. The control operates in the same way as described above in connection with a warming operation.

The cam shown in Figs. 6 and 7 provides a regulating range of different characteristics, as graphically illustrated in Fig. 11. Assume, for example, a warming operation at 200°. The knob is adjusted to provide the bulb temperature range of 162° to 201° illustrated by the line 200° in Fig. 11. In beginning such a warming operation, the heating element is continuously energized until the bulb temperature reaches 162°. As the temperature increases further, the cam begins to move the contact 61 out of engagement with the contact 62, and this is effective initially throughout 125 degrees of revolution of the driven cam. Accordingly, the wattage immediately drops to 65 per cent. Upon increase in temperature from 162° to 182°, the wattage is gradually decreased from 65 to 20 per cent as indicated by the intermediate portion of the line. As the temperature continues to increase above 182°, the wattage continues to decrease although at a lesser rate. When a bulb temperature of 196°, corresponding to a vessel temperature of 200°, is reached, equilibrium is attained, as represented by the intersection of the line 200° with the line b, and no further increase in temperature occurs.

One advantage of the double slope cam may be explained as follows: Referring to Fig. 11, the change in wattage for each degree change in bulb temperature, provided by the portions e and i of the cam, is not so great between zero and 20 per cent wattage. The importance of this is that if the temperature calibration is slightly in error, there will not be so great a variation in wattage. In other words, in this particular zone wattage regulation is emphasized.

Between 20 per cent and 65 per cent wattage, the portions f and h of the cam provide a greater change in wattage for each degree change in bulb temperature. If the control is not calibrated accurately or if several vessels of several different radiation loss characteristics are used, it does require as great a change in bulb temperature to obtain the required change in wattage. In this case, the greater emphasis is on temperature regulation.

A further advantage of the cam shown in Figs. 6 and 7 is that it provides a more rapid separation of the contacts, and it also brings them into contact more rapidly, the separation and engagement of the contacts being most rapid in the region of the lower wattages, in which region the control operates the greater part of the time.

The lines "Lo," "Me" and "Hi" in Fig. 11 represent temperature settings which provide three different rates of boiling which have again been chosen as low, medium and high rates or degrees of boiling. These settings provide approximately 8 per cent, 15 per cent, and 40 per cent of full wattage, respectively, as represented by the intersections of these lines with the line a. The scheme of operation is the same as described above.

Figure 14:
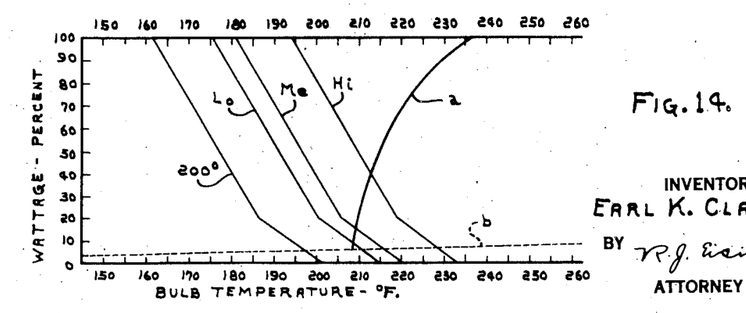
Fig. 14 is a graph illustrating the relation of wattage to bulb temperature for several adjustments, using the motor-driven cam of Fig. 12.

The operation of an embodiment using the motor-driven cam of Fig. 12 will now be considered. Assume a temperature setting of 200° as represented by the line 200° in Fig. 14, representing a bulb temperature range of 162° to 201°. Full wattage is obtained until the bulb temperature reaches 162°. The wattage is then decreased proportionally from 100 per cent to 20 per cent as the bulb temperature increases from 162° to about 187°. As the temperature increases further, the wattage decreases further but at a lesser rate, until equilibrium is reached at a bulb temperature of about 197° and vessel temperature of 200°. Temperature settings designated "Lo," "Me" and "Hi" in Fig. 14 provide different rates of boiling, as represented by the intersections with the line a, in a manner similar to that described above.

The present control is ideally suited to automatic pressure cooking. A standard pressure cooking vessel may be used. Since a pressure cooker is a fluid-tight vessel which confines the water vapor, the temperature and the pressure of the water vapor within the vessel may rise, each varying as a function of the other. For example, a temperature of 250° provides a pressure of 15 lbs. per sq. in., and a temperature of 260° provides a pressure of 20 lbs. per sq. in. Therefore, to effect pressure cooking with the present apparatus at a pressure of 15 lbs. per sq. in., which is commonly used, it is merely necessary to place the closed pressure cooking vessel on the surface unit and to adjust the knob to the position which provides 250°, and which position may be so designated and may be further designated "15 lbs. per sq. in." The control now operates in the same manner as described above in connection with warming and frying and grilling operations to vary the wattage input to maintain the desired temperature in the pressure cooker. To cook at any other pressure, it is merely necessary to adjust the control to maintain the corresponding temperature. With this type of control, it will be seen that it is not necessary to complicate the pressure cooker with control devices, nor is it necessary to have a control connection between the vessel and the surface unit.

Assume now that the vessel on the surface unit is still at a high temperature and that the knob is turned to the "off" position. The cam 46 moves the upper end of the lever 74 to the right, tilting the lever 74 as a whole in clockwise direction and raising the lever 63. Movement of the latter, however, is limited by engagement of the abutment 89 with the stop 90, thereby preventing the pivot pin 72 from moving to the left. In this case, the spring 78 yields and permits the part 76 to move to the right away from the part 75. As the chamber 28 contracts, the spring 78 returns the part 75 to its normal position relative to the part 76, with the set screw 79 bearing against the part 76.

It will be understood that the controls for the surface units 12 and 13 may be identical with the control for the unit 11, except that the switch parts are disposed in different parts of the casing 43. The control for the deep well cooker 15 may also be the same. In this case, the thermostatic bulb 21 may be located centrally of the heating unit, as shown in Fig. 3, or it may be disposed in engagement with any other part of the deep well cooker vessel.

An important characteristic of my invention is that the temperature-responsive mechanism merely positions a stationary contact and does not itself effect the contact movement that makes and breaks the circuit. Such movement is effected by the motor driving the cam and the spring arm, which periodically actuate the cooperating contact to make and break the circuit.

While I have shown my invention in several forms, it will be obvious to those skilled in the art that it is not so limited, but is susceptible of various other changes and modifications without departing from the spirit thereof.

What I claim is:

1. Temperature-responsive electrical control mechanism comprising a hydraulic system comprising a bulb, a diaphragm and a tube connecting said bulb and said diaphragm and filled with an expansible liquid, a switch mechanism comprising a pair of abutting contacts, means for periodically moving one of said contacts toward and away from the other, a lever adapted at one point thereof to position said other contact, said lever being positioned at a second point thereof by said diaphragm, and a manually-positioned member for positioning said lever at a third point thereof for determining the temperature setting of the control mechanism.

2. In a temperature-responsive control, the combination of a bracket or lever, a pivot for movably mounting said lever, a spring arm attached to and carried by said lever, said lever and said spring arm having cooperating abutting contacts, said spring arm having a cam follower, a cam engaging said follower in the direction to separate said contacts, means for continuously rotating said cam, and means for adjusting said lever about said pivot from a position in which the follower is continuously out of contact with the cam and the contacts are continuously in engagement, through positions in which the cam separates the contacts progressively greater portions of each revolution thereof, to a position in which the cam maintains the contacts continuously separated.

3. In a control for a heating element or the like, the combination of a switch comprising first and second abutting contacts, means for positioning the first contact to vary the length of contact engagement, a continuously-rotating cam and a cam follower engaging the cam surface thereof for periodically moving the second contact toward and away from said first contact, said switch being cyclically opened and closed by said periodic movement of the second contact to vary the duration of the "on" period or period of contact engagement in each cycle in accordance with the position of the first contact, said cam being characterized in that the portion of the cam surface thereof which effects opening of the contacts when the first contact is positioned to provide short "on" periods is of greater incline than an inclined portion of said cam surface which effects opening of the contacts when the first contact is positioned to provide greater "on" periods, whereby more rapid separation of the contacts is obtained for short "on" periods.

4. A control comprising a switch, means for periodically opening and closing said switch, means including temperature-responsive means for decreasing the period that the switch is closed in response to increase in temperature through a temperature range and increasing said period in response to decrease in temperature through said range, and means for adjusting the control to vary the temperature range through which the switch is periodically opened and closed including a cam and a manually-actuated member for positioning the cam, the cam being characterized in that a portion of the cam surface thereof which provides temperature ranges including the boiling point of water is of less incline or slope than portions thereof which provide temperature ranges above and below the point of water, whereby closer control of the switch-closed period may be obtained when the temperature-responsive means responds to the boiling point of water.

5. A control comprising a switch, means for periodically opening and closing said switch, means including temperature-responsive means for decreasing the "on" period in response to increase in temperature throughout a limited range and increasing said period in response to decrease in temperature throughout such limited range, and means for adjusting the control to vary the limited temperature range through which the switch is periodically opened and closed including a cam and a manually-actuated member for positioning the cam, the cam being characterized in that the portion of the cam surface thereof which provides "on" periods of relatively short duration when the temperature-responsive means responds to the boiling point of water is of less slope or incline than portions on opposite sides thereof, whereby closer control of the "on" period is obtained for relatively low rates of boil.

6. A control for an electric heating element or the like comprising first and second abutting contacts, means for periodically moving the first contact toward and away from said second contact, and mechanism for positioning said second contact including a lever, a manually adjustable cam positioning said lever at one point along its length, temperature-responsive means positioning said lever at a second point along its length, said lever at a third point along its length positioning said second contact in accordance with the resultant of the action of said cam and of said temperature-responsive means, said cam having an intermediate portion which is of less slope or incline than adjacent portions on opposite sides thereof and which intermediate portion provides, when said temperature-responsive means responds to boiling temperature, variation in length of engagement of said contacts to provide different degrees of boiling.

7. An intermittent make and break control for an electric heating element comprising a switch mechanism having a compound lever system including a first lever fulcrumed on a stationary member and a second lever positioning said first lever, a manually adjustable cam positioning said second lever at one point thereof, temperature-responsive means positioning said second lever at a second point thereof, said second lever at a third point thereof positioning said first lever in accordance with the resultant of the action of said cam and of said temperature-responsive means, a spring arm carried by said first lever and self-biased toward the same, abutting contacts carried by said first lever and said spring arm, said spring arm having a cam follower, and a continuously rotating cam adapted to engage said cam follower in the direction to separate said contacts.

8. A control comprising a pivoted bracket or lever, a spring arm mounted on said lever and extending generally parallel thereto, a pair of abutting contacts carried by said lever and said spring arm, respectively, a cam, a motor connected to said cam for continuously driving the same, a cam follower engaging said cam and connected to said spring arm for moving the contact carried thereby toward and away from the other contact as said cam rotates, a hydraulic system comprising a temperature-responsive bulb, a diaphragm and a connecting tube, said system being filled with liquid, a second lever pivoted to said first lever, said diaphragm being engageable with said second lever and adapted to tilt the same, upon increase in the temperature imposed on said bulb, in the direction to decrease the time of engagement of said contacts, and a manually adjustable cam engaging said second lever at another point to adjust the temperature setting of the control.

9. In a temperature-responsive control, the combination of a first lever, a pivot for movably mounting said lever, a spring arm attached to and carried by said lever, said lever and said spring arm having cooperating abutting contacts, said spring arm having a cam follower, a cam engaging said follower in the direction to separate said contacts, means for continuously rotating said cam to effect separation of said contacts during a portion of each revolution of the cam, a second lever pivoted to the first lever and adapted to tilt the same about said pivot for adjusting the same to vary the time of contact separation during each revolution of the cam, and temperature-responsive means and a manually adjustable cam bearing against the second lever at spaced points on opposite sides of the lever to tilt the lever in the direction to provide decreased time of contact engagement.

10. The combination set forth in claim 9 wherein the second lever and the lever arm of the first lever between said pivot and said pivotal connection extend transversely of the general extent of the first lever.

11. In a temperature-responsive control for an electric heating element, the combination of a switch, a continuously rotated cam for periodically opening and closing said switch, a lever comprising first and second parts pivoted to each other, means biasing said parts into a predetermined relation so that they act normally as a single lever, said composite lever being connected at one point to said switch for adjusting the same to increase or decrease the length of switch closing in each period or revolution of the cam, temperature-responsive means bearing against said lever at a second point in the direction to tilt the lever for decreasing the length of switch closing and operable to tilt the lever in such direction upon increase in temperature, a manually-adjustable cam bearing against said lever at a third point in the direction to tilt the lever in the direction for decreasing the length of switch closing, the parts being constructed and arranged so that upon excessive movement of said temperature-responsive means said biasing means yields and permits relative movement between said parts, and means exerting a spring force on said lever tending to tilt the lever against said temperature-responsive means and against said cam.

12. In an adjustable temperature-responsive control, the combination of a compound lever comprising first and second parts disposed generally in alignment and pivoted to each other intermediate the ends of the lever, the second part having a portion overlapping the first part, a spring biasing the overlapping portions against each other so that said parts normally act together as a single lever, an adjustable member carried by one of the overlapping parts and bearing against the other in opposition to said spring bias for calibrating the control, a manually adjustable cam positioning one end of the lever, the other end of the lever being connected to a part to be controlled, and temperature-responsive means positioning said lever at a point intermediate its ends and acting thereon in the direction against said spring force in response to increase in temperature, whereby said spring yields and permits relative movement between said parts upon excessive action of said temperature-responsive means in said direction, and means for biasing said one end of the lever against said cam.

EARL K. CLARK.

REFERENCES CITED

The following references are of record in the file of this patent:

UNITED STATES PATENTS

| Number | Name | Date |
|---|---|---|
| 1,239,594 | Harlow | Sept. 11, 1917 |
| 1,420,348 | Swift | June 20, 1922 |
| 1,541,600 | Steenstrup | June 9, 1925 |
| 1,767,636 | Wilhjelm | June 24, 1930 |
| 1,852,102 | Bast et al. | Apr. 5, 1932 |
| 2,091,734 | Himes | Aug. 31, 1937 |
| 2,167,824 | Bear et al. | Aug. 1, 1939 |
| 2,182,048 | Elmer | Dec. 5, 1939 |
| 2,207,634 | Myers | July 9, 1940 |
| 2,210,947 | Myers et al. | Aug. 13, 1940 |
| 2,224,983 | Parkhurst | Dec. 17, 1940 |
| 2,246,186 | Prince | June 17, 1941 |
| 2,294,573 | Potter | Sept. 1, 1942 |
| 2,295,298 | Sharp | Sept. 8, 1942 |
| 2,303,012 | Weber et al. | Nov. 24, 1942 |
| 2,329,417 | Pearce | Sept. 14, 1943 |
| 2,333,319 | Kucera | Nov. 2, 1943 |
| 2,416,261 | Kemper | Feb. 18, 1947 |

FOREIGN PATENTS

| Number | Country | Date |
|---|---|---|
| 525,089 | Great Britain | Aug. 21, 1940 |

OTHER REFERENCES

"Instruments," December 1937, pages 305 and 317.

Certificate of Correction

Patent No. 2,500,061                                        March 7, 1950

EARL K. CLARK

It is hereby certified that errors appear in the printed specification of the above numbered patent requiring correction as follows:

Column 4, line 12, for "hub 27" read *bulb 27*; column 10, line 20, for "197° C." read *197°*; column 11, line 39, for the words "or boil" read *of boil*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*